(12) United States Patent
Unnikrishnan et al.

(10) Patent No.: US 11,836,241 B1
(45) Date of Patent: Dec. 5, 2023

(54) AUTOMATIC UPDATE OF USER INFORMATION

(71) Applicant: Allstate Insurance Company, Northbrook, IL (US)

(72) Inventors: Ullas Unnikrishnan, Chicago, IL (US); Nicole Kristine Frana, Chicago, IL (US); Daniel Carrasco Garcia, Chicago, IL (US); Joe Rule, Chicago, IL (US); E. Mitchell Hopper, Naperville, IL (US)

(73) Assignee: Allstate Insurance Company, Northbrook, IL (US)

( * ) Notice: Subject to any disclaimer, the term of this patent is extended or adjusted under 35 U.S.C. 154(b) by 658 days.

(21) Appl. No.: 16/821,640

(22) Filed: Mar. 17, 2020

Related U.S. Application Data

(60) Provisional application No. 62/820,662, filed on Mar. 19, 2019.

(51) Int. Cl.
| | | |
|---|---|---|
| *G06F 21/45* | (2013.01) | |
| *G06F 16/9535* | (2019.01) | |
| *G06F 21/31* | (2013.01) | |
| *G06F 21/41* | (2013.01) | |
| *G06F 21/60* | (2013.01) | |
| *G06F 21/00* | (2013.01) | |

(52) U.S. Cl.
CPC .......... *G06F 21/45* (2013.01); *G06F 16/9535* (2019.01); *G06F 21/31* (2013.01); *G06F 21/41* (2013.01); *G06F 21/604* (2013.01)

(58) Field of Classification Search
CPC .......... G06F 21/45; G06F 21/31; G06F 21/41; G06F 21/604; G06F 21/30; G06F 21/42
See application file for complete search history.

(56) References Cited

U.S. PATENT DOCUMENTS

| | | | |
|---|---|---|---|
| 10,535,104 B1 * | 1/2020 | Mitchell | G06Q 40/08 |
| 2008/0133677 A1 * | 6/2008 | Pattabhiraman | H04L 51/28 |
| | | | 709/204 |
| 2013/0212393 A1 * | 8/2013 | D'Souza | H04L 9/0891 |
| | | | 713/171 |
| 2014/0344907 A1 * | 11/2014 | Wan | G06F 16/972 |
| | | | 726/6 |
| 2018/0040062 A1 * | 2/2018 | Dintenfass | G06F 21/6254 |

* cited by examiner

*Primary Examiner* — Edward Zee
(74) *Attorney, Agent, or Firm* — Dinsmore & Shohl LLP

(57) ABSTRACT

Methods, computer-readable media, software, and apparatuses may assist a user in automatically updating their personal information across a plurality of entities which have previously stored the user's personal information.

19 Claims, 4 Drawing Sheets

US 11,836,241 B1

AUTOMATIC UPDATE OF USER INFORMATION

CROSS REFERENCE TO RELATED APPLICATIONS

This application claims the benefit of and priority to U.S. Provisional Patent Application Ser. No. 62/820,662, filed Mar. 19, 2019, and entitled "Automatic Update of User Information," the contents of which is incorporated herein by reference in its entirety for all purposes.

FIELD OF ART

Aspects of the disclosure relate to computer hardware and software. In particular, one or more aspects of the disclosure relate to updating of user information across various computing systems.

BACKGROUND

When a person moves to a new residence, or changes their name, they currently have to manually update their name or contact information among various relevant entities. Such a person may need to contact utility companies, government driver's license offices, post offices, banks, magazine subscription providers, and credit card companies, to name a few. Current name or address change solutions include the manual printing and mailing of paper forms or letters to various entities. In some cases, such a person will need to log into websites of several entities to update personal information.

Accordingly, there is a need for methods and systems to make the update of personal information across various entities easier and more efficient.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure relate to an automated application or service for updating user information across multiple entities. In some embodiments, the user may submit a name change or an address change to a single application or website and the application or website may automatically update the user's name and/or address with a plurality of the relevant entities.

BRIEF DESCRIPTION OF THE DRAWINGS

The present invention is illustrated by way of example and is not limited by the accompanying figures in which like reference numerals indicate similar elements and in which.

DETAILED DESCRIPTION

In accordance with various aspects of the disclosure, methods, computer-readable media, software, and apparatuses are disclosed for automatically updating, with appropriate permissions of a user, the user's personal information across a plurality of entities which have previously stored the user's personal information. Personal information may include information such as the user's name, address, and telephone number(s), among others.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
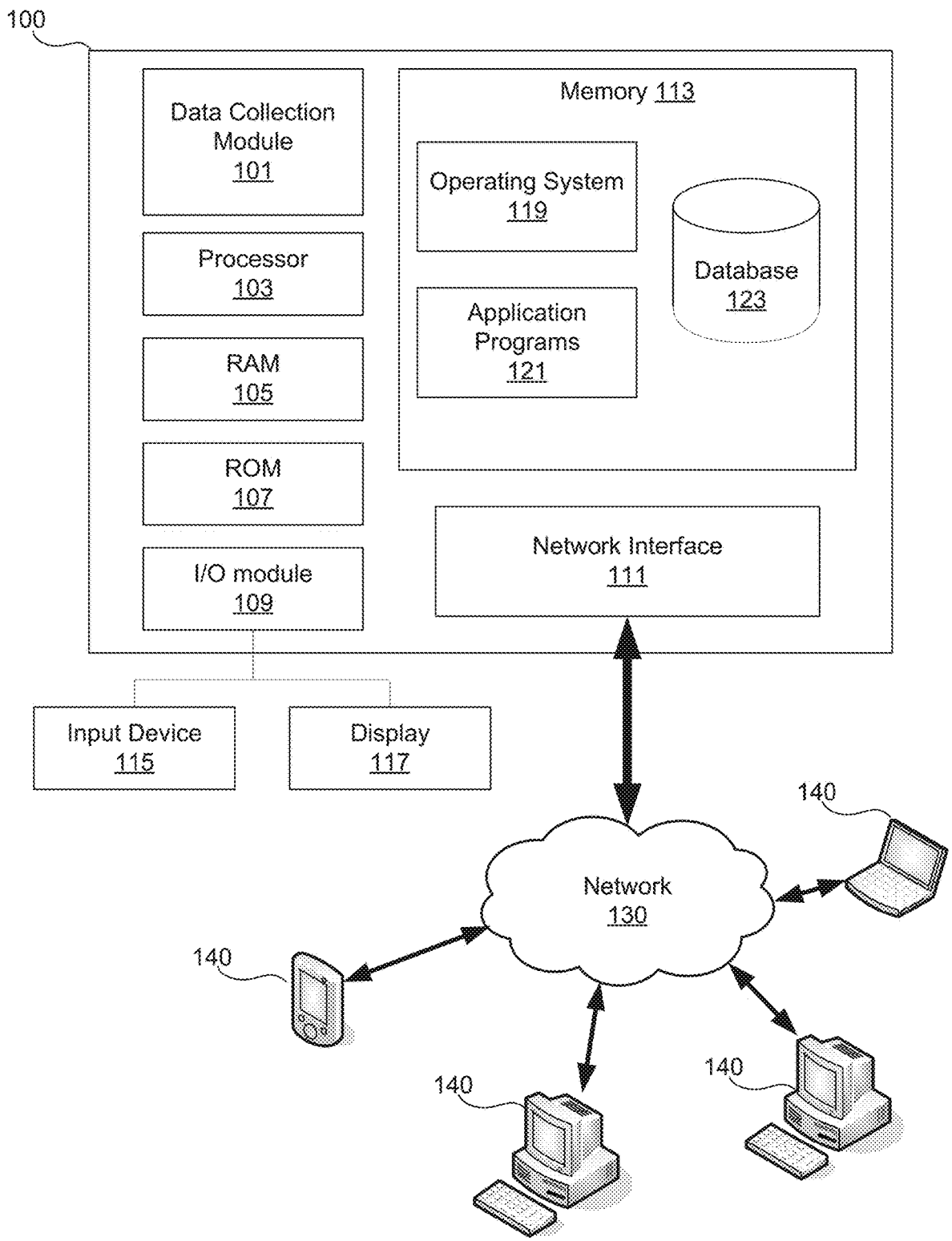
FIG. 1 illustrates an example computing device that may be used in accordance with one or more aspects described herein.

In one or more arrangements, aspects of the present disclosure may be implemented with a computing device. FIG. 1 illustrates a block diagram of an example automatic update system 100 that may be used in accordance with aspects described herein. The automatic update system 100 may be a computing device, such as a personal computer (e.g., a desktop computer), server, laptop computer, notebook, tablet, smartphone, vehicles, home management devices, home security devices, smart appliances, etc. The automatic update system 100 may have a data collection module 101 for retrieving and/or analyzing data as described herein. The data collection module 101 may be implemented with one or more processors and one or more storage units (e.g., databases, RAM, ROM, and other computer-readable media), one or more application specific integrated circuits (ASICs), and/or other hardware components (e.g., resistors, capacitors, power sources, switches, multiplexers, transistors, inverters, etc.). Throughout this disclosure, the data collection module 101 may refer to the software and/or hardware used to implement the data collection module 101. In cases where the data collection module 101 includes one or more processors, such processors may be specially configured to perform the processes disclosed herein. Additionally, or alternatively, the data collection module 101 may include one or more processors configured to execute computer-executable instructions, which may be stored on a storage medium, to perform the processes disclosed herein. In some examples, automatic update system 100 may include one or more processors 103 in addition to, or instead of, the data collection module 101. The processor(s) 103 may be configured to operate in conjunction with data collection module 101. Both the data collection module 101 and the processor(s) 103 may be capable of controlling operations of the automatic update system 100 and its associated components, including RAM 105, ROM 107, an input/output (I/O) module 109, a network interface 111, and memory 113. For example, the data collection module 101 and processor(s) 103 may each be configured to read/write computer-executable instructions and other values from/to the RAM 105, ROM 107, and memory 113.

The I/O module 109 may be configured to be connected to an input device 115, such as a microphone, keypad, keyboard, touchscreen, and/or stylus through which a user of the automatic update system 100 may provide input data. The I/O module 109 may also be configured to be connected to a display device 117, such as a monitor, television, touchscreen, etc., and may include a graphics card. The display device 117 and input device 115 are shown as separate elements from the automatic update system 100; however, they may be within the same structure. On some automatic update systems 100, the input device 115 may be operated by users to interact with the data collection module 101, including providing user information and/or preferences, device information, account information, warning/suggestion messages, etc., as described in further detail below. System administrators may use the input device 115 to make updates to the data collection module 101, such as software updates. Meanwhile, the display device 117 may assist the system administrators and users to confirm/appreciate their inputs.

The memory 113 may be any computer-readable medium for storing computer-executable instructions (e.g., software). The instructions stored within memory 113 may enable the automatic update system 100 to perform various functions. For example, memory 113 may store software used by the automatic update system 100, such as an operating system 119 and application programs 121, and may include an associated database 123.

The network interface 111 may allow the automatic update system 100 to connect to and communicate with a network 130. The network 130 may be any type of network, including a local area network (LAN) and/or a wide area network (WAN), such as the Internet, a cellular network, or a satellite network. Through the network 130, the automatic update system 100 may communicate with one or more other computing devices 140, such as laptops, notebooks, smartphones, tablets, personal computers, servers, websites, vehicles, home management devices, home security devices, smart appliances, etc. The computing devices 140 may also be configured in a similar manner as automatic update system 100. In some embodiments the automatic update system 100 may be connected to the computing devices 140 to form a "cloud" computing environment.

The network interface 111 may connect to the network 130 via communication lines, such as coaxial cable, fiber optic cable, etc., or wirelessly using a cellular backhaul or a wireless standard, such as IEEE 802.11, IEEE 802.15, IEEE 802.16, etc. In some embodiments, the network interface may include a modem. Further, the network interface 111 may use various protocols, including TCP/IP, Ethernet, File Transfer Protocol (FTP), Hypertext Transfer Protocol (HTTP), etc., to communicate with other computing devices 140.

Figure 2:
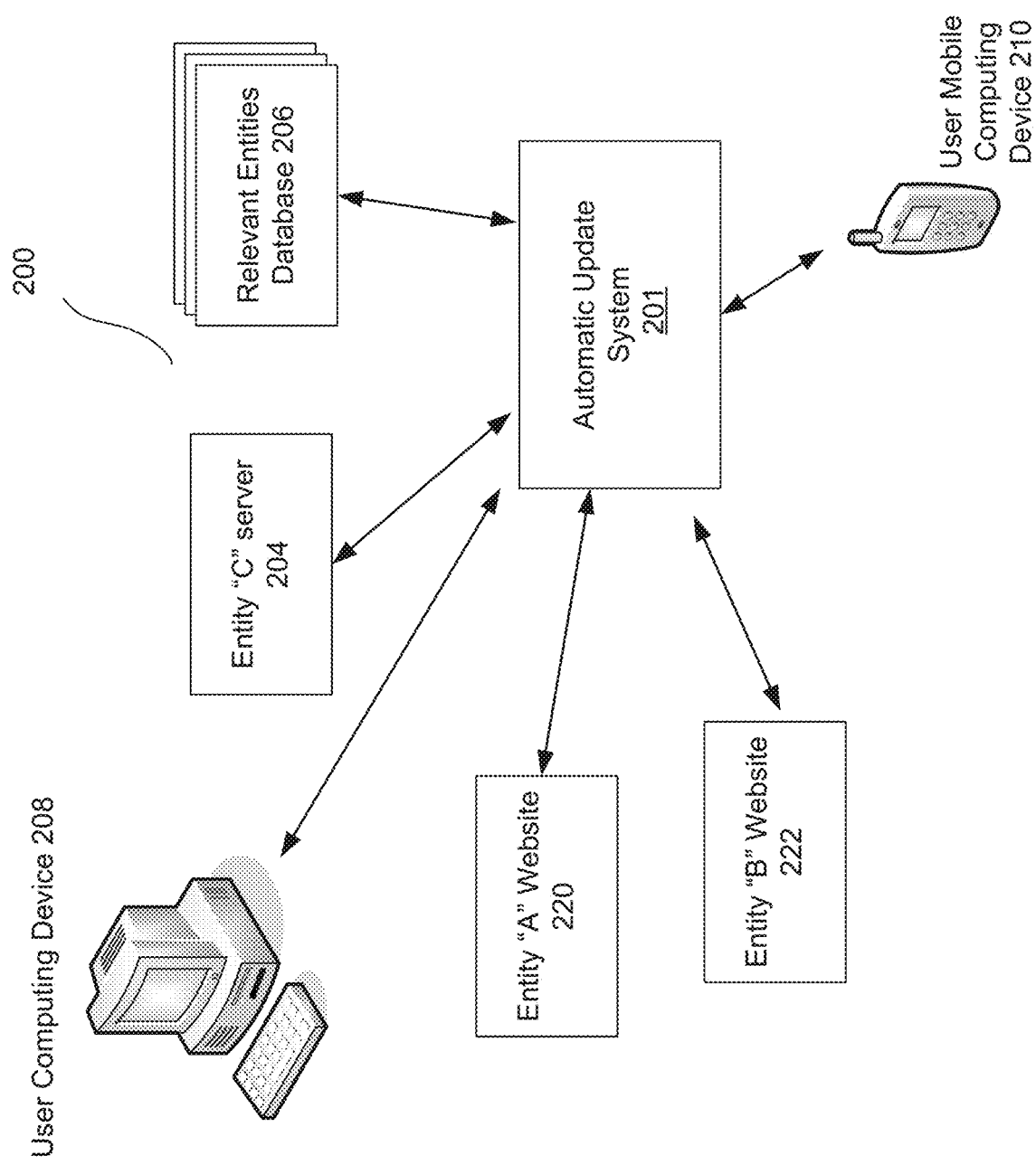
FIG. 2 shows a diagram illustrating the system architecture for a system in accordance with one or more aspects described herein.

FIG. 2 shows a block diagram 200 illustrating typical communication linkages associated with an automatic update system 201. The automatic update system 201 may collect information from, and transmit information to, a user through various different channels, such as via a user mobile computing device 210, or via a user computing device 208. Aspects directed to the capture, transmission, and/or use of user data may, in some embodiments, be dependent on the permission of the user. In some embodiments, the automatic update system 201 may receive a request from a user to update their personal information and the automatic update system 201 may transmit an update of the user's personal information to one or more entities that are associated with the user. In some embodiments, a user may use a web browser or other application on user computing device 208 to request that the automatic update system 201 update their personal information at entities associated with the user. In other embodiments, the automatic update system 201 may be implemented as an application on a user device and a user may enter a request directly into the application.

In some embodiments, the user may identify one or more entities, such as Entity "A" website 220 and/or Entity "B" website 222 as entities where the user's personal information should be updated. In some embodiments, automatic update system 201 may determine what entities are associated with the user and may provide the user with an indication of the identified entities for the user to select among. For example, the automatic update system 201 may present the user with a listing of associated entities and allow the user to select one or more of the entities to be provided with the updated personal information.

In an aspect of the disclosure, automatic update system 201 may be configured to, in operation, determine the entities associated with a user. For example the automatic update system 201 (for example, via the data collection module 101) may determine the entities associated with a user by analyzing the user's email, analyzing the user's browser history, and/or analyzing the user's browser cache.

The automatic update system 201 may be pre-configured with information related to various entities that may be commonly impacted by a change in a user's personal information. Examples of these types of entities may include driver's license offices, passport agencies, and utility companies. In some embodiments, the automatic update system 201 may be pre-configured with information related to which utility companies service various addresses, so that the automatic update system 201 can identify which services will be needed at a particular residence address and include these entities as associated entities. Indications of the pre-configured entities may be displayed to the user for selecting when updating the user's personal information.

Upon determining the entities associated with a user, automatic update system 201 may store results of the determination in the relevant entities database 206 (which may correspond to database 123 of FIG. 1). In some embodiments, the automatic update system 201 may store contact information to enable the automatic update system 201 to communicate electronically with each of the entities. For example, communication information related to entity "C" server 204 and/or information related to entity "A" website 220 may be stored in the entities database 206. Communication information may include internet protocol addresses, Uniform Resource Locators, login credentials, email addresses, etc.

After receiving a request from the user to update the personal information, regardless of whether the user has identified the associated entities or the automatic update system 201 has determined the entities, the automatic update system 201 may communicate, for example, via a network, with each of the entities to provide the updated personal information. In some embodiments, the automatic update system 201 may cause one or more of the entities to update the personal information stored at the entity. For example, the automatic update system 201 may transmit a command along with the updated personal information to cause the receiving entity to make an update to the user's personal information or the automatic update system 201 may log into the entity to make the updates.

In some embodiments, a trust relationship may be established between the automatic update system 201 and one or more entities. The trust relationship may allow the automatic update system 201 trusted access to the one or more entities and allow the automatic update system 201 to manage or control update of the personal information of various users.

This trusted access may be referred to herein as "backchannel" communications. Using backchannel communications, the automatic update system 201 and one or more entities may share a backend communications protocol and login, for example, as part of a partnership agreement. In some embodiments, the backchannel communications may allow the automatic update system 201 to modify one or more user's personal information stored at an entity. In some embodiments, a secure digital channel may be used for the backchannel.

In some other embodiments, the automatic update system 201 may, with a user's permission, access a user's password manager service or application in order to obtain the user's login credentials associated with one or more entities. For example, the automatic update system 201 may prompt the user to log into their personal password manager, provide the automatic update system 201 a password or one-time key for the password manager, or otherwise enable the automatic update system 201 to access information stored therein. In these embodiments, the automatic update system 201 may then use the user's login credentials to log into servers or websites of corresponding entities and make or request an update of the user's personal information.

Figure 3:
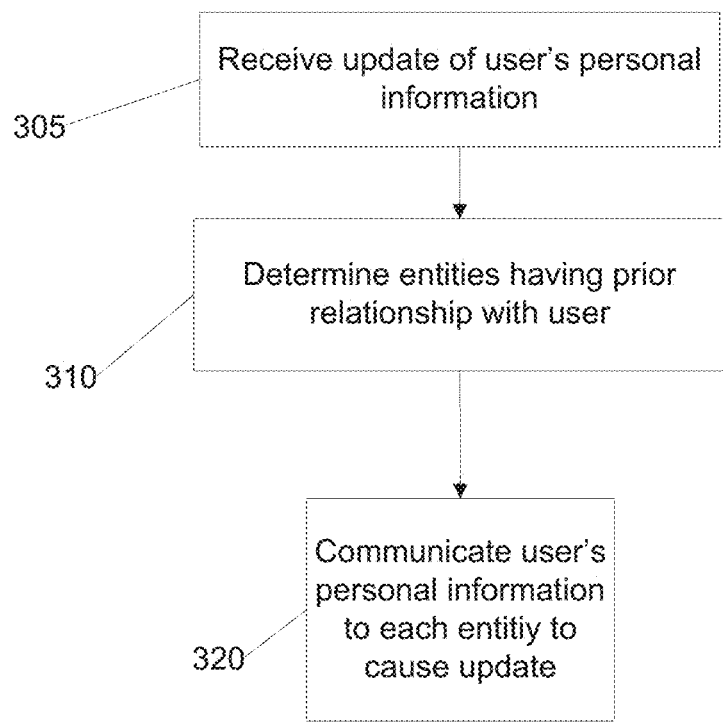
FIG. 3 illustrates an exemplary method for updating a user's personal information in accordance with one or more aspects described herein.

FIG. 3 depicts a method for automatic update of user information as disclosed herein. Aspects directed to the capture, transmission, and/or use of user data may, in some embodiments, be dependent on the permission of the user. At step 305, the automatic update system 201 may receive an update of a user's personal information. In some embodiments, the user may enter the information in an application user interface.

At step 310, the automatic update system 201 may determine one or more entities having a prior relationship with the user. In some embodiments, the user may inform the automatic update system 201 of entity relationships. In some other embodiments, one or more entities may inform the automatic update system 201 of relationships with a user. In some other embodiments, the automatic update system 201 or other system may analyze various user information and/or communications in order to determine entities which have a relationship with the user. In various embodiments, the automatic update system 201 may determine a subset of the entities as being applicable to the update of the user's personal information. For example, if the update relates to a new address of the user, then entities storing the user's address may be determined as applicable to the update, while entities not storing the user's address may be determined as not applicable to the update.

At step 320, automatic update system 201 may update user personal information of each entity (or each applicable entity). As discussed above, the automatic update system 201 may contact each of the entities via a trusted backchannel communications link and perform or provide the update. In some other embodiments, the automatic update system 201 may access the user's password manager and then log into websites or servers of each entity to update the user's personal information.

Figure 4:
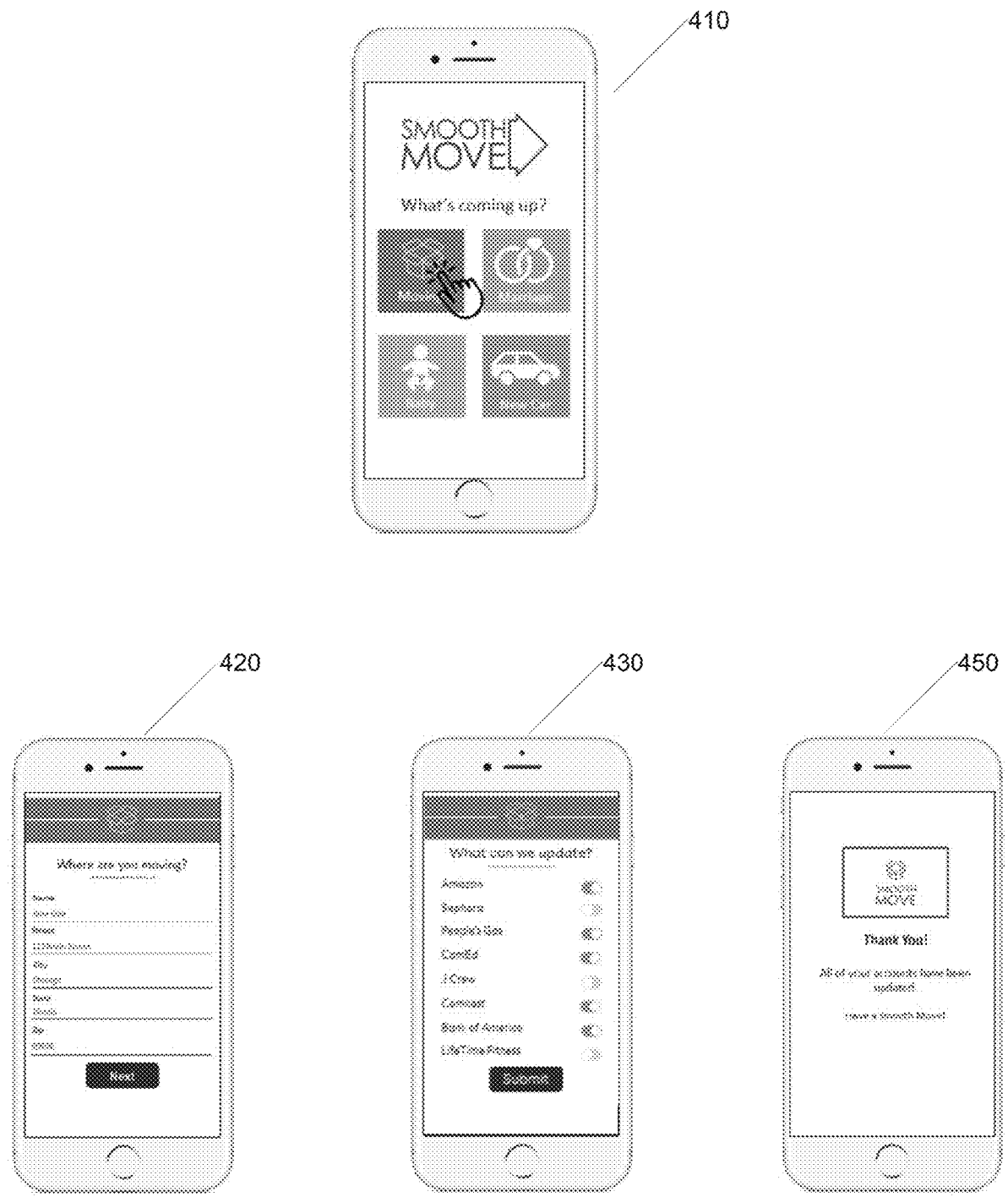
FIG. 4 illustrates an example user interface for a mobile application in accordance with one or more aspects described herein.

FIG. 4 illustrates exemplary user interface screens of an application for updating a user's personal information. In some embodiments in which the automatic update system 201 is implemented in a server, the user interface screens may be displayed by a browser on a mobile device.

In some other embodiments in which the automatic update system 201 is implemented in a mobile application, the user interface screens may be displayed by the mobile application itself. In these embodiments, a user who desires to change his or her personal information may invoke a mobile application on a mobile device, such as a smart phone or tablet computing device.

Upon invoking the web browser or application (referred to below as "mobile application"), the user may be presented with options representing activities, such as life change events, that may each necessitate the updating of related personal information. For example, user interface screen 410 may present a user with options for "Moving", "Marriage", "Baby", and "New Car." Each of these events are activities which may necessitate a change in a user's personal information. For example, a marriage may necessitate a name change, moving may necessitate an address change, and having a baby or purchasing a new car may necessitate an update with a health insurance company or an auto insurance company, respectively. The events presented in user interface screen 410 are examples of common events. Personal information updates necessitated by other events may also be made using the methods disclosed herein.

In some embodiments, user interface screen 410 may present information indicative of types of information change, such as "name change" or "address change," instead of, or in addition to, presenting options representing life change events, and the user may select the type of information they want to change. The presentation of the life change events, as shown in user interface screen 410, is one exemplary way that the automatic update system 201 may organize or direct the user's interaction, for the benefit of the user. For example, by receiving information about the life change event, the mobile application may be configured to suggest additional entities that may need update.

Upon selecting one of the options in user interface screen 410, the user may be taken through various additional user interface screens to help the user accomplish the personal information update. In the example shown in user interface screen 410, the user has selected "Moving." Having received the selection of "Moving", the mobile application may next present the user with a user interface screen 420 in which the user may input an address for the move destination. In some embodiments, the user may be prompted to enter previous personal information as well as the updated personal information. For example, the user might be prompted to enter their previous mailing address and their new mailing address. When the user is done entering the information, the user may select "next" to go to the next screen.

After receiving the "next" selection, the mobile application may present user interface screen 430 in which the user may select which of a plurality of entities the user would like to send the updated personal information to. In some embodiments, the automatic update system 201 may present entities that the user has an account or other relationship with. In some embodiments, the automatic update system 201 may include one or more pre-configured entities among the plurality of entities. The pre-configured entities may be selected based on the selection made in user interface screen 410 or on information entered in user interface screen 420. As discussed above, the entities listed may correspond to entities determined by the automatic update system 201 to be applicable to the event. In some embodiments, the automatic update system 201 may list categories of entities and the user may browse through a number of categories and entities listed in each category may be selected by the user. For example, in embodiments where the automatic update system 201 has not determined an entity for providing a particular utility service at a new address, the automatic update system 201 may present a list of utility providers for selection by the user. In some embodiments, the automatic update system 201 may list various documents, in addition to, or instead of, corresponding entities, for selection by the user. For example, "driver's license" may be presented, rather than a name of the entity where the driver's license information is to be updated. After selecting the entities or documents, the user may select "submit" to signal to the mobile application that the selection is complete.

After receiving the "submit" selection, the mobile application may contact each of the entities and supply the updated personal information. In some embodiments, the mobile application may cause the data to be changed at one or more of the entities. In other embodiments, the mobile application may send the updated information along with a request for the entity to update the user's personal information. In some embodiments, the application may update the user's personal information and display user interface screen 450 to the user indicating that all accounts have been updated.

In some embodiments, automatic update system 201, or another system, may determine or predict that the user will need to update personal information, without the user having to explicitly inform the automatic update system 201. For example, automatic update system 201 may predict that a user is going to move and will need to update their mailing address. The prediction may, in some embodiments, be based on information about the user's purchase history, credit history, electronic communications with entities or other users, banking activity, driving history, GPS location history, number of people living with the user, size of current residence, magazines subscribed to, time since previous relocation, and personal activities the user participates in, among others. This information may be compared to information of other users and with other users' rate of moving/relocating. The automatic update system 201 may receive this information from external information gathering services. In some embodiments, automatic update system 201 may receive information on recent home sales and may use this information in predicting that a user is planning to move. In some embodiments, the automatic update system 201 may determine that a user will be renting or owning at the new location and may determine what personal information to update based on the determination.

Using the above described information, the automatic update system 201 may predict an event, for example, by use of a decision tree. In some embodiments, the automatic update system 201 may pre-populate certain data entry forms, such as user interface screen 420, with predicted user information, such as the move-to address. After predicting that the user will need to update personal information, in some embodiments the automatic update system 201 may provide a notification to the user, the notification offering to update the user's personal information. For example, automatic update system 201 may predict that a user is going to move may provide a notification to the user, the notification offering to update the user's mailing address.

Aspects of the invention have been described in terms of illustrative embodiments thereof. Numerous other embodiments, modifications, and variations within the scope and spirit of the description will occur to persons of ordinary skill in the art from a review of this disclosure. For example, one of ordinary skill in the art will appreciate that the steps disclosed in the description may be performed in other than the recited order, and that one or more steps may be optional in accordance with aspects of the invention.

Exemplary Embodiments

A method comprising: receiving an update of a user's personal information; determining a plurality of entities having a prior relationship with the user; and providing the update to each of the plurality of entities. In some embodiments, prior to receiving the update, the method may include predicting that the user's personal information should be updated; and outputting, for display, a notification offering to update the user's personal information. In some embodiments, the predicting may comprise predicting based on data describing a purchase history of the user, credit history, electronic communications with entities or other users, banking activity, driving history, GPS location history, number of people living with the user, a size of a current residence, magazines subscribed to, time since previous relocation, and personal activities the user participates in, wherein the personal information may comprise a name or an address, wherein the providing the update to each of the plurality of entities may comprise: accessing a password manager associated with the user to obtain login credentials; and using the login credentials, logging into an entity to update the user's personal information. In some embodiments, the providing the update to each of the plurality of entities may comprise: providing the update to at least one of the plurality of entities using a backchannel communications pathway. In some embodiments, the entities having the prior relationship with the user may comprise: entities having stored personal information of the user.

One or more non-transitory computer-readable media may store instructions that, when executed by a computing device, may cause the computing device to: receive an update of a user's personal information; determine a plurality of entities having a prior relationship with the user; and provide the update to each of the plurality of entities.

What is claimed is:

1. A method comprising:
   outputting, by a computing device, a graphical user interface for updating personal information associated with a user;
   receiving, by the computing device and via the graphical user interface, a user input indicative of a request to update the personal information associated with the user as a result of a move to a new address;
   receiving an update to the personal information, wherein the update comprises the new address;
   determining a plurality of entities having a prior relationship with the user, wherein each entity of the plurality of entities comprise an entity account associated with the user, each entity account for each entity comprising a password associated with the user to login to the entity account for the user;
   sending, via a network, information indicative of the update to each of the plurality of entities; and
   establishing a trust relationship with at least one of the plurality of entities, such that future updates to the personal information associated with the user are automatically provided to the at least one of the plurality of entities having the trust relationship.

2. The method of claim 1, wherein the sending the information indicative of the update to each of the plurality of entities comprises:
   accessing a password manager associated with the user to obtain login credentials; and
   using the login credentials, communicating with each of the plurality of entities to update the personal information.

3. The method of claim 1, wherein the sending the information indicative of the update to each of the plurality of entities comprises providing the update to at least one of the plurality of entities using a backchannel communications pathway.

4. The method of claim 1, wherein the determining the plurality of entities having the prior relationship with the user comprises:
determining the plurality of entities by analyzing an email, analyzing a browser history, or by analyzing a browser cache.

5. The method of claim 1, further comprising:
determining at least one entity of the plurality of entities based on pre-configured entity information associated with the new address; and
sending the information indicative of the update to the at least one entity.

6. The method of claim 1, further comprising:
determining at least one entity of the plurality of entities based on pre-configured entity information associated with the request; and
sending the information indicative of the update to the at least one entity.

7. A method comprising:
outputting, by a computing device, a graphical user interface for updating personal information associated with a user;
receiving, by the computing device and via the graphical user interface, a user input indicative of an event associated with the user;
receiving an update to personal information associated with the user, wherein the update is related to the event;
determining a plurality of entities that are applicable to the event, wherein each entity of the plurality of entities comprise an entity account associated with the user, each entity account for each entity comprising a password associated with the user to login to the entity account for the user;
providing, via a network, information indicative of the update to each of the plurality of entities; and
establishing a trust relationship with at least one of the plurality of entities, such that future updates to the personal information associated with the user are automatically provided to the at least one of the plurality of entities having the trust relationship.

8. The method of claim 7, wherein the providing the information indicative of the update to each of the plurality of entities comprises:
accessing a password manager associated with the user to obtain login credentials; and
using the login credentials, communicating with each of the plurality of entities to update the personal information.

9. The method of claim 7, wherein the providing the information indicative of the update to each of the plurality of entities comprises providing the update to at least one of the plurality of entities using a backchannel communications pathway.

10. The method of claim 7, wherein the determining the plurality of entities that are applicable to the event comprises:
determining the plurality of entities by analyzing an email, analyzing a browser history, or by analyzing a browser cache.

11. The method of claim 7, wherein the update to the personal information comprises a new mailing address, and wherein the determining the plurality of entities that are applicable to the event comprises:
determining the plurality of entities based on pre-configured entity information associated with the new mailing address.

12. The method of claim 7, wherein the determining the plurality of entities that are applicable to the event comprises:
determining the plurality of entities based on pre-configured entity information associated with the event.

13. The method of claim 7, wherein the personal information comprises a name of the user or an address of the user.

14. The method of claim 7, wherein the event comprises a move to a new address and the receiving the update comprises receiving the new address.

15. A method comprising:
predicting, by a computing device, an event that causes a change in personal information associated with a user;
based on the predicting, outputting, for display via a graphical user interface, a notification offering to update the personal information;
determining a plurality of entities that are applicable to the event, wherein each entity of the plurality of entities comprise an entity account associated with the user, each entity account for each entity comprising a password associated with the user to login to the entity account for the user;
responsive to an input via the graphical user interface, providing, via a network, information indicative of the update to each of the plurality of entities; and
establishing a trust relationship with at least one of the plurality of entities, such that future events that cause a change in the personal information associated with the user are automatically provided to the at least one of the plurality of entities having the trust relationship.

16. The method of claim 15, wherein the predicting comprises predicting based at least in part on data describing a purchase history of the user.

17. The method of claim 15, wherein the predicting comprises predicting based at least in part on a location history associated with the user.

18. The method of claim 15, wherein the predicting comprises predicting based on information associated with recent home sales.

19. The method of claim 15, wherein the determining the plurality of entities that are applicable to the event comprises:
determining the plurality of entities based on pre-configured entity information associated with the event.

* * * * *